United States Patent
MacDonald

(10) Patent No.: US 8,963,986 B2
(45) Date of Patent: Feb. 24, 2015

(54) SYSTEM AND METHOD FOR SCALING A VIDEO PRESENTATION BASED ON PRESENTATION COMPLEXITY AND ROOM PARTICIPANTS

(75) Inventor: Alan J. MacDonald, Malvern, PA (US)

(73) Assignee: Cisco Technology, Inc., San Jose, CA (US)

( * ) Notice: Subject to any disclaimer, the term of this patent is extended or adjusted under 35 U.S.C. 154(b) by 295 days.

(21) Appl. No.: 13/558,813

(22) Filed: Jul. 26, 2012

(65) Prior Publication Data

US 2014/0028781 A1 Jan. 30, 2014

(51) Int. Cl.
*H04N 7/14* (2006.01)

(52) U.S. Cl.
USPC .................................. 348/14.07; 348/14.08

(58) Field of Classification Search
USPC ........ 345/629, 633, 637; 375/240.01, 240.26; 348/14.01, 14.03, 14.07, 14.08, 14.16, 348/14.12
See application file for complete search history.

(56) References Cited

U.S. PATENT DOCUMENTS

| | | | |
|---|---|---|---|
| 5,307,055 A | 4/1994 | Baskin | |
| 6,031,934 A | 2/2000 | Ahmad et al. | |
| 6,108,001 A | 8/2000 | Tuttle | |
| 7,388,981 B2 | 6/2008 | Jouppi | |
| 7,716,344 B2 | 5/2010 | Salesky et al. | |
| 8,107,540 B2 * | 1/2012 | Mohandas | 375/240.26 |
| 8,117,458 B2 | 2/2012 | Osborn | |
| 8,687,021 B2 * | 4/2014 | Bathiche et al. | 345/633 |
| 2002/0093626 A1 * | 7/2002 | Asamura | 353/30 |
| 2008/0048973 A1 | 2/2008 | McKay | |
| 2009/0146915 A1 * | 6/2009 | Marathe | 345/7 |
| 2012/0026193 A1 * | 2/2012 | Higeta | 345/637 |
| 2013/0050399 A1 * | 2/2013 | Gorzynski et al. | 348/14.08 |
| 2013/0293667 A1 * | 11/2013 | Guduru | 348/14.12 |
| 2014/0022331 A1 * | 1/2014 | Bansal | 348/14.07 |

* cited by examiner

*Primary Examiner* — Olisa Anwah
(74) *Attorney, Agent, or Firm* — Patent Capital Group

(57) ABSTRACT

A method is provided in one example embodiment and includes receiving a first presentation material for a videoconference, wherein the first presentation material is to be displayed in a display area associated with the videoconference; determining a first complexity of the first presentation material; and displaying the first presentation material on a first display based on the determined first complexity. In more particular embodiments, the method can include determining a location of a participant that will view the first presentation material; and displaying the presentation material on a second display based on the location of the participant. The location of the participant can be determined using audio data or video data.

20 Claims, 10 Drawing Sheets

US 8,963,986 B2

SYSTEM AND METHOD FOR SCALING A VIDEO PRESENTATION BASED ON PRESENTATION COMPLEXITY AND ROOM PARTICIPANTS

TECHNICAL FIELD

This disclosure relates in general to the field of communications and, more particularly, to scaling a video presentation based on presentation complexity and room participants.

BACKGROUND

Video services have become increasingly important in today's society. In certain architectures, service providers may seek to offer sophisticated videoconferencing services for their participants. The videoconferencing architecture can offer an "in-person" meeting experience over a network. Videoconferencing architectures can deliver real-time, face-to-face interactions between people using advanced visual, audio, and collaboration technologies. The ability to optimize video communications provides a significant challenge to system designers, device manufacturers, and service providers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving a first presentation material for a videoconference, wherein the first presentation material is to be displayed in a display area associated with the videoconference; determining a first complexity of the first presentation material; and displaying the first presentation material on a first display based on the determined first complexity. In more particular embodiments, the method can include determining a location of a participant that will view the first presentation material; and displaying the presentation material on a second display based on the location of the participant. The location of the participant can be determined using audio data or video data.

In yet other more detailed embodiments, the display area comprises a single screen that can be electronically divided into a plurality of smaller screens. In addition, the determining can include, for example, scanning the first presentation material to determine the first complexity and a text size associated with the first presentation material. In yet other example implementations, a face detection operation, voice positioning data, room setup information, data from multiple camera angles, etc. can be used to determine an approximate distance between a participant of the videoconference and a screen being viewed by the participant.

Example Embodiments

Figure 1A:
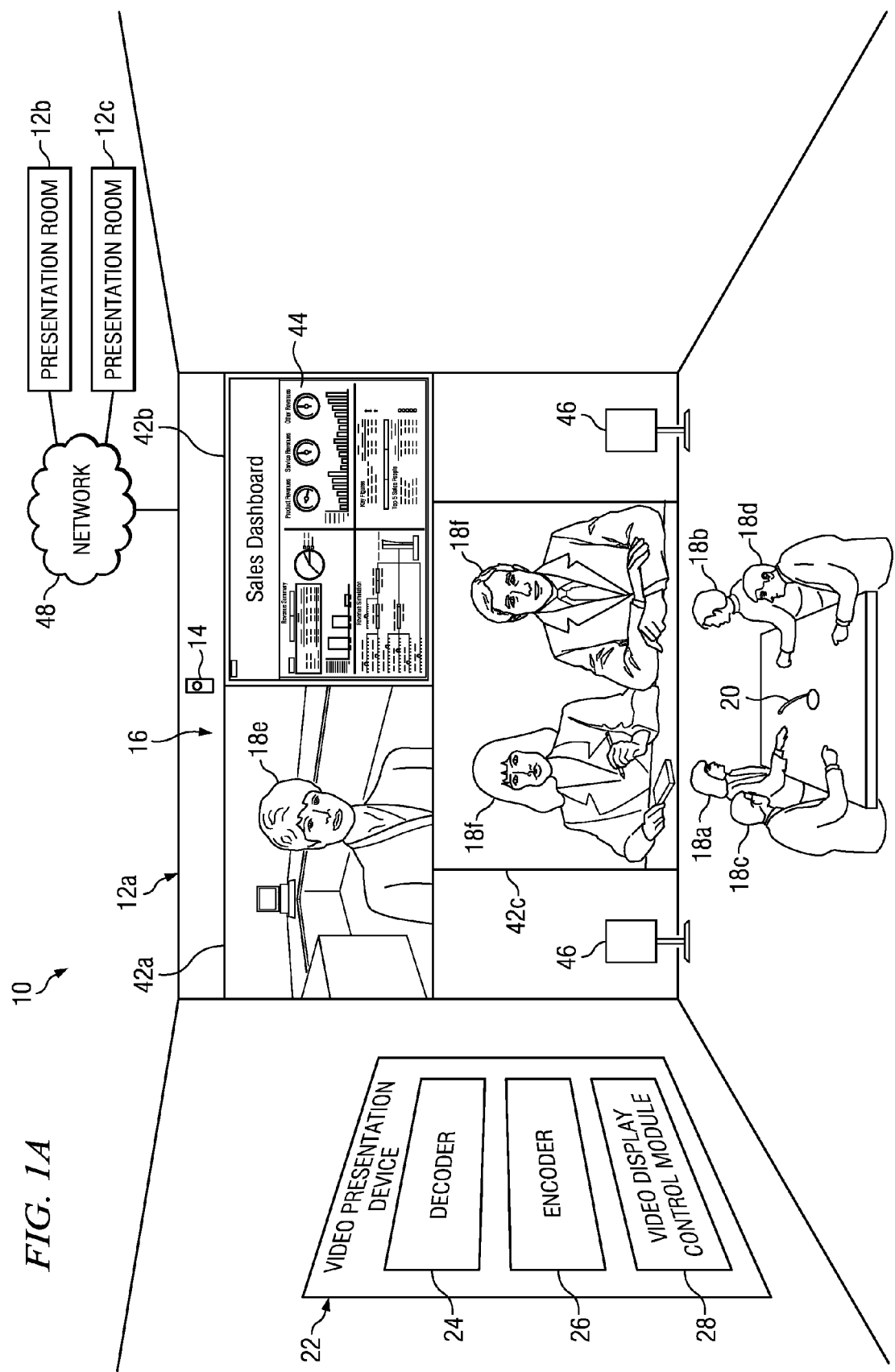
FIG. 1A is a simplified block diagram of a system for scaling a video presentation based on presentation complexity and room participants in accordance with one embodiment of the present disclosure.

Turning to FIG. 1A, FIG. 1A is a simplified block diagram of a system 10 for scaling a video presentation based on presentation complexity and room participants in accordance with one embodiment of the present disclosure. System 10 includes a presentation room 12a, remote presentation rooms 12b and 12c, a camera 14, a display area 16, participants 18a-d, a microphone 20, a video presentation device 22, speakers 46, and a network 48. Display area 16 includes display screens 42a-c. Video presentation device 22 includes a decoder 24, an encoder 26, and a video display control module 28.

Display screens 42a and 42c contain remote participants 18e and 18f. Each remote participant 18e and 18l may be a single participant or a plurality of participants and may be from the same remote presentation room (e.g., remote presentation room 12b) or from different remote presentation rooms (e.g., remote participant 18e may be from remote presentation room 12b and remote participant 18l may be from remote presentation room 12c). Display screen 42b contains presentation material 44. Video presentation device 22 is configured to display remote participants 18e and 18f and presentation material 44 on display screens 42a-c.

System 10 can be configured to automatically scale presentation content (e.g., presentation material 44) in a multi-display Telepresence call based on the distance participants (e.g., participants 18a-d) are from the displays (e.g., display screen 42a-c) and/or the complexity of the presentation material (e.g., presentation material 44). In one particular example, system 10 can be configured to determine that the complexity of presentation material 44 has increased and, based on that determination, presentation material 44 is automatically moved from one screen to a bigger screen.

Figure 1B:
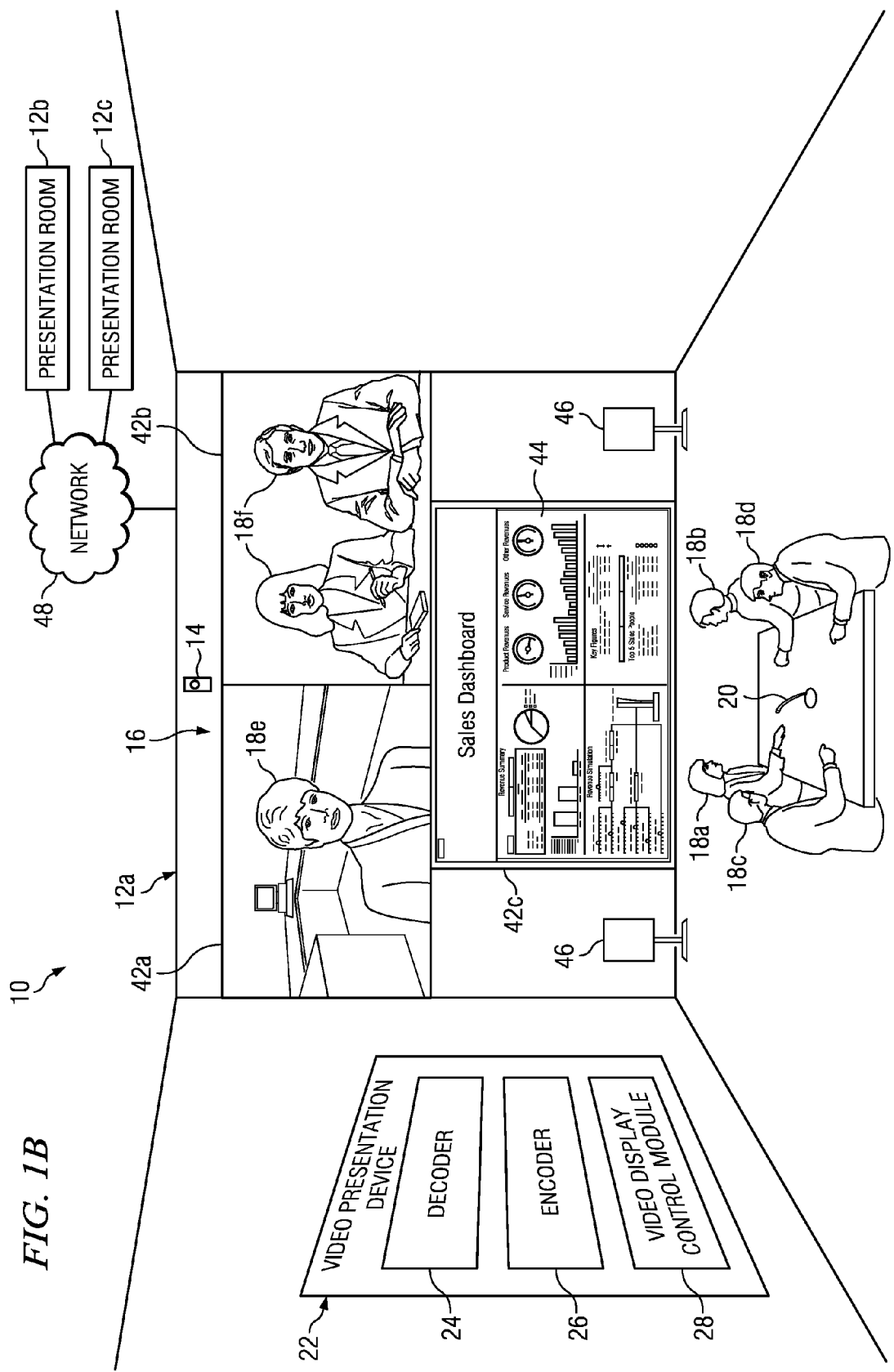
FIG. 1B is a simplified block diagram illustrating an alternative embodiment of the present disclosure in which display areas are varied.

FIG. 1B is introduced in order to highlight these activities. More specifically, FIG. 1B is a block diagram illustrating an alternative arrangement for display area 16 in accordance with an example embodiment of system 10. Due to the complexity of presentation material 44, it has been moved to a bigger screen (i.e., display screen 42c, as illustrated in FIG. 1B). In another particular example, system 10 can be configured to determine that the distance of participants 18a-d to display area 16 has increased (e.g., participants 18a-d move to a far end of a table) and, based on that determination, presentation material 44 is automatically moved from one screen (e.g., display screen 42b, as illustrated in FIG. 1A) to a bigger screen (e.g., display screen 42c, as illustrated in FIG. 1B). In yet another embodiment, system 10 can be configured to determine both the complexity of presentation material 44 and the distance of participants 18a-d to display area 16 and, based on those determinations, presentation material 44 is automatically moved from one screen (e.g., display screen 42b, as illustrated in FIG. 1A) to a bigger screen (e.g., display screen 42c, as illustrated in FIG. 1B).

For purposes of illustrating certain example techniques of system 10, it is important to understand some of the challenges associated with videoconferencing. The following foundational information may be viewed as a basis from which the present disclosure may be properly explained. Videoconferencing allows two or more locations to interact via simultaneous two-way video and audio transmissions. The usability of systems for videoconferencing and Telepresence needs to be able to serve multiple purposes such as connect separate locations by high quality two-way video and audio links, share presentations and other graphic material (static graphics or film) with accompanying audio, provide a means for live collaboration between participants in the separate locations, etc. Typical videoconferencing systems comprise a number of end-points communicating real-time video, audio and/or data (often referred to as duo video) streams over and between various networks such as WAN, LAN, and circuit switched networks. A number of videoconference systems residing at different sites may participate in the same conference, most often, through one or more Multipoint Control Units (MCUs) perform switching and mixing functions to allow the audiovisual terminals to intercommunicate properly.

Videoconferencing systems presently provide communication between at least two locations for allowing a videoconference among participants situated at each station. Typically, the videoconferencing arrangements are provided with one or more cameras. The outputs of those cameras are transmitted along with audio signals to a corresponding plurality of displays at a second location such that the participants at the first location are perceived to be present or face-to-face with participants at the second location. Videoconferencing and Telepresence continues to grow, where new functions are continually being developed to augment system performance and to improve the user's experience. Along similar lines, video resolution has advanced, and the screen size has systematically increased. To maximize the usability of systems for videoconferencing and Telepresence, they should be able to serve multiple purposes, for example, connect separated locations by high quality two-way video and audio links, share presentations and other graphic material (static graphics or film) with accompanying audio, provide tools for live collaborations between people in separate geographic locations, etc.

The representation of people from a separate location, for instance sitting at a meeting room table, is done by capturing a video image with a camera, and reproducing the image on a screen locally. The display is like looking through a transparent boundary into the other room. The same applies to multichannel audio captured by a microphone system. In addition, a multi-site or connecting multiple rooms and/or sites is often required. As a result, the layout of the reproduction quickly becomes a challenge, especially with multiple sites and with many people in each site. The representation of a presentation (documents, pre-produced graphics material or film) should be presented in such a manner as to allow participants to be able to understand the presentation. During a Telepresence meeting, presentation content (PowerPoint slides, spreadsheets, etc.) can have varying complexity, detail, and text size that can be difficult for some participants to read due to the complexity of the presentation material and/or their varying distance from the display area.

In accordance with one example implementation, system 10 can automatically scale presentation content in a multi-display Telepresence call based on the distance participants are from the display area and/or the complexity of the presentation content. In one example implementation, during a Telepresence call, when displaying a presentation on a multi-screen endpoint (e.g., display area 16), the presentation may be extended either across multiple screens or, if there are screens of varying size, the presentation may be displayed on an appropriately-sized screen to scale the presentation for easier reading.

In an embodiment, the scaling of the presentation may be accomplished by scanning the presentation (e.g., by any of the components of FIG. 1A) to determine the complexity and text size of the presentation. For example, video presentation device 22 can provide this function, or an endpoint could provide this function (e.g., an i-Pad, a laptop, a tablet, etc.). In another embodiment, the use of face detection (e.g., an algorithm to be performed by video presentation device 22), voice positioning data, room setup information, and/or data from multiple camera angles may be used to determine the distance of the participants from the screens. Again, these activities can be performed by any of the infrastructure of FIG. 1A (e.g., video presentation device 22, endpoints, etc.). The information can then be used to find a size to scale the presentation across multiple displays (or to an appropriately sized display).

In terms of the infrastructure of the present disclosure, the call signaling of system 10 can be provided by a session initiation protocol (SIP) in accordance with one example implementation of the present disclosure. In addition, the media for the videoconferencing platform can be provided by Secure Real-time Transport Protocol (SRTP), or any other appropriate real-time protocol. SRTP addresses security for RTP and, further, can be configured to add confidentiality, message authentication, and replay protection to that protocol. SRTP can be valuable for protecting voice over IP (VoIP) traffic because it can be used in conjunction with header compression and, further, it generally has no effect on IP quality of service (QoS). For network address translation (NAT)/firewall (FW) traversal, any suitable mechanism can be employed by system 10. In one particular example, these functions can be provided by a split-tunneled virtual private network (VPN) with session traversal utilities for NAT (STUN) and Interactive Connectivity Establishment (ICE).

Signaling can propagate to a call agent via the VPN. Additionally, media can be sent directly from one endpoint to another endpoint (i.e., from one videoconferencing platform to another). Note that as used herein, the term 'media' is inclusive of audio data (which may include voice data) and video data (which may include any type of image data). The video data can include any suitable images (such as that which is captured by a camera, by a counterparty's camera element, by a Webcam, by a smartphone, by an iPad, etc.). The term 'smartphone' as used herein includes any type of mobile device capable of operating in conjunction with a video service. This would naturally include items such as a Google Droid, an iPhone, etc. In addition, the term 'signaling data' is inclusive of any appropriate control information that can be sent toward a network. This may be inclusive of traffic used to establish a video session initially, along with any type of negotiations (e.g., for bit rates, for bandwidth, etc.) that may be appropriate for the particular videoconference. This may further be inclusive of items such as administrative traffic, account traffic (for participant account management), contact lists, and/or other types of traffic, which are not provided as part of the media data.

In order to handle symmetric NAT, Traversal Using Relay NAT (TURN) can be used by system 10 in particular embodiments. Participant names for the videoconferencing platform can be provided by E.164 numbers in a particular example. Alternatively, the participant naming can be a simple participant ID (e.g., assigned by the service provider, selected by the participant, etc.), a full name of the participant (or a group name), an avatar, or any other symbol, number, or letter combination that can be used to distinguish one participant from another. Note that a single name can also be associated with a group (e.g., a department, a business unit, etc.). The security for communications of system 10 can be addressed in a number of ways. In one implementation, the video services can be protected by any suitable security protocol (e.g., security software, adaptive security appliances (ASA), etc.). Additionally, intrusion protection systems, firewalls, anti-denial of service mechanisms can be provided for the architecture (both out of the network, and/or locally within a residential environment).

In operation of an example implementation, system 10 can be used to conduct videoconferences (e.g., supporting both inbound and outbound directional call flows). For the inbound call scenario, on reception of an inbound call request, video presentation device 22 can be configured to connect to a microphone(s) (e.g., microphone 20) or a paired handset(s) (e.g., waking it from sleep, where appropriate). If configured to do so, a user interface (UI) can also be displayed on video presentation device 22 or over any passthrough video sources on display area 16. In the case of an ad hoc outbound conference, a participant can select a conferencee from their contact list, select a conferencee via a speed dial setting, or alternatively the participant can enter any type of identifier (e.g., a telephone number, a name, a videoconferencing number directly). If the conferencee answers, the call scenario proceeds, similar to that of an inbound call. In the case of a hold and resume scenario, an in-call UI signal can be provided to put a call on hold, and subsequently the call can be resumed at a later time. Note that in other instances, system 10 can be used to execute scheduled calls, call transfer functions, multipoint calls, and/or various other conferencing capabilities. In one example, secure business endpoints may be supported, where signaling and media would be secure (both audio and video). Appropriate messages can be displayed in a UI to inform the participant of the reason for any security-forced call drops. Signaling can be considered secure by having both a business exchange and consumer networks physically co-located, or by using a secure tunnel (e.g., a site-to-site VPN tunnel) between the two entities.

Display area 16 offers a screen or display on which video data can be rendered for the participants. Note that as used herein in this Specification, the term 'display' is meant to connote any element that is capable of delivering image data (inclusive of video information), text, sound, audiovisual data, etc. to participants. This would necessarily be inclusive of any screen-cubes, panel, plasma element, television (which may be high-definition), monitor, computer interface, screen, Telepresence devices (inclusive of Telepresence boards, panels, screens, surfaces, etc.), or any other suitable element that is capable of delivering/rendering/projecting (from front or back) such information. In an embodiment, display area 16 is equipped with a multi-touch system for collaboration.

In certain implementations, microphone 20 can be used as a remote control for system 10. For example, microphone 20 can offer a wireless remote control that allows it to communicate with display area 16, and/or video presentation device 22 via a wireless network link (e.g., infrared, Bluetooth, any type of IEEE 802.11-based protocol, etc.). Microphone 20 can further be provisioned as a wireless mobile phone (e.g., a speakerphone device) with various dial pads. In other implementations, microphone 20 operates as a learning mechanism and/or a universal remote controller, which allows it to readily control display area 16, video presentation device 22, and/or any audiovisual (AV) receiver device (e.g., managing functions such as ON/OFF, volume, input select, etc. to enhance the overall video experience). In a particular set of examples, a specific button on microphone 20 can launch a UI for navigating through any number of options provided in submenus of the UI software. Additionally, a dedicated button can be used to make/answer calls, end calls, turn on/off camera elements of camera 14, turn on/off microphone 20, turn on/off video presentation device 22, etc. Furthermore, a set of playback controls can be provided on microphone 20 in order to control the video data being rendered on display area 16.

Network 48 represents a series of points or nodes of interconnected communication paths for receiving and transmitting packets of information that propagate through system 10. Network 48 offers a communicative interface between presentation room 12a and one or both remote presentation rooms 12b and 12c, and may be any local area network (LAN), wireless local area network (WLAN), metropolitan area network (MAN), wide area network (WAN), VPN, Intranet, Extranet, or any other appropriate architecture or system that facilitates communications in a network environment.

Camera 14 is a video camera configured to capture, record, maintain, cache, receive, and/or transmit image data. This could include transmitting packets over network 48 to a suitable next destination. The captured/recorded image data could be stored in camera 14, or be provided in some suitable storage area (e.g., a database, a server, video presentation device 22, etc.). In one particular instance, camera 14 can be a separate network device and have a separate IP address. Camera 14 could include a wireless camera, a high-definition camera, or any other suitable camera device configured to capture image data.

Camera 14 may interact with (or be inclusive of) devices used to initiate a communication for a video session, such as a switch, video presentation device 22, a proprietary endpoint, microphone 20, a dial pad, a bridge, a telephone, a computer, or any other device, component, element, or object capable of initiating video, voice, audio, media, or data exchanges within system 10. Camera 14 may also be configured to include a receiving module, a transmitting module, a processor, a memory, a network interface, a call initiation and acceptance facility such as a dial pad, one or more displays, etc. Any one or more of these items may be consolidated, combined, eliminated entirely, or varied considerably and those modifications may be made based on particular communication needs.

Camera 14 can include a high-performance lens and an optical zoom, where camera 14 is capable of performing panning and tilting operations. The video and the audio streams can be sent from camera 14 to video presentation device 22, where they are mixed into an HDMI stream. In certain implementations, camera 14 can be provisioned as a light sensor such that the architecture can detect whether the shutter of a camera is open or closed (or whether the shutter is partially open.) An application program interface (API) can be used to control the operations of camera 14.

Video presentation device 22 is configured to receive information from camera 14 (e.g., via some connection that may attach to an integrated device). Video presentation device 22 may also be configured to control compression activities, or additional processing associated with data received from camera 14. Alternatively, an actual integrated device can perform this additional processing before image data is sent to its next intended destination. Video presentation device 22 can also be configured to store, aggregate, process, export, or otherwise maintain image data and logs in any appropriate format, where these activities can involve a processor and a memory element. Video presentation device 22 can include a video element that facilitates data flows between endpoints and a given network. As used herein in this Specification, the term 'video element' is meant to encompass servers, proprietary boxes, network appliances, set-top boxes, or other suitable device, component, element, or object operable to exchange video information with camera 14.

In operation, video presentation device 22 can be configured to establish, or to foster a video session between one or more end users, which may be located in various other sites and locations. Video presentation device 22 can also coordinate and process various policies involving endpoints (e.g., a laptop, a Skype interface, a smartphone, etc.). In general, video presentation device 22 may communicate with the endpoints through any standard or proprietary conference control protocol. Video presentation device 22 may include a switching component that determines which signals are to be routed to individual endpoints. Video presentation device 22 can also determine how individual end users and presentation materials are seen by others involved in the video conference based on control elements (which may be found in presentation elements). Furthermore, video presentation device 22 can control the timing and coordination of these activities. Video presentation device 22 can also include a media layer that can copy information or data, which can be subsequently retransmitted or simply forwarded along to one or more endpoints.

Video presentation device 22 may interface with camera 14 through a wireless connection, or via one or more cables or wires that allow for the propagation of signals between these elements. These devices can also receive signals from an intermediary device, a remote control, speakers 46, etc. and the signals may leverage infrared, Bluetooth, WiFi, electromagnetic waves generally, or any other suitable transmission protocol for communicating data (e.g., potentially over a network) from one element to another. Virtually any control path can be leveraged in order to deliver information between video presentation device 22, camera 14, microphone 20, speakers 46, etc. Transmissions between these devices can be bidirectional in certain embodiments such that the devices can interact with each other. This would allow the devices to acknowledge transmissions from each other and offer feedback where appropriate. Any of these devices can be consolidated with each other, or operate independently based on particular configuration needs. In one particular instance, camera 14 is intelligently powered using a USB cable. In a more specific example, video data is transmitted over an HDMI link, and control data is communicated over a USB link.

Video presentation device 22 is a network element that can facilitate the videoconferencing activities discussed herein. As used herein in this Specification, the term 'network element' is meant to encompass any of the aforementioned elements, as well as multipoint control units (MCUs), routers, switches, manager elements, cable boxes, gateways, bridges, loadbalancers, firewalls, inline service nodes, controllers, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

Figure 2:
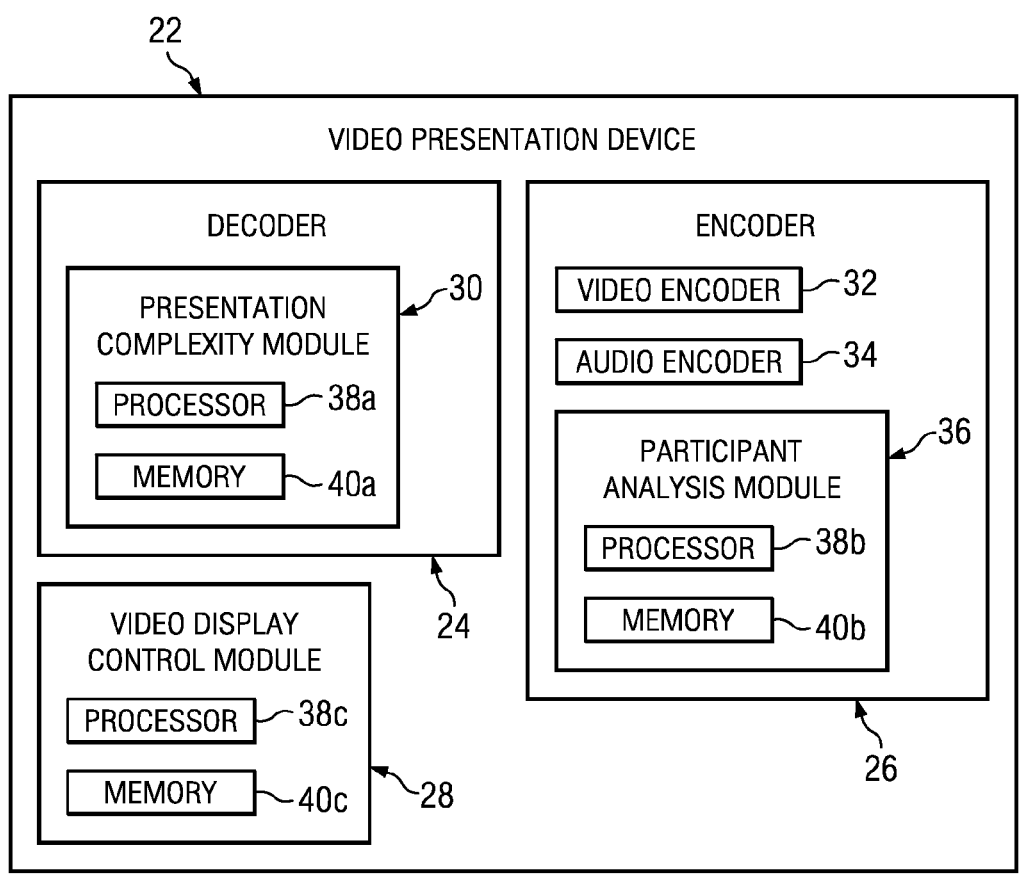
FIG. 2 is a simplified block diagram illustrating example details associated with internal structures associated with the present disclosure.

Turning to FIG. 2, FIG. 2 is a block diagram illustrating example internal structures associated with video presentation device 22. In this example, decoder 24 includes a presentation complexity module 30, which includes a processor 38a and memory 40a. Encoder 26 includes a video encoder 32, an audio encoder 34, and a participant analysis module 36, which includes a processor 38b and memory 40b. Video display control module 28 may include a processor 38c and memory 40c in this particular example embodiment.

In operation, video encoder 32 can be configured to encode video received from camera 14. Audio encoder 34 can be configured to encode audio received from microphone 20. Encoder 26 can be configured to communicate the encoded video and encoded audio to remote presentation rooms 12b and 12c. Using the video and audio received by encoder 26, participant analysis module 36 can be configured to estimate the distance that participants are from display area 16 by using face detection, voice positioning data, room setup information, multiple camera angles, or any combination thereof or any other means for estimate the distance of participants from display area 16.

Decoder 24 can be configured to receive audio and video data from remote presentation room 12b and/or 12c and decode the signals to create a video signal to be displayed on screens 42a-c and an audio signal to be sent to speakers 46. Presentation complexity module 30 can be configured to determine the complexity of presentation material 44 present in the video signal. Using the complexity as determined by presentation complexity module 30, video display control module 28 can be configured to determine which display to use to display presentation material 44.

Figure 3A:
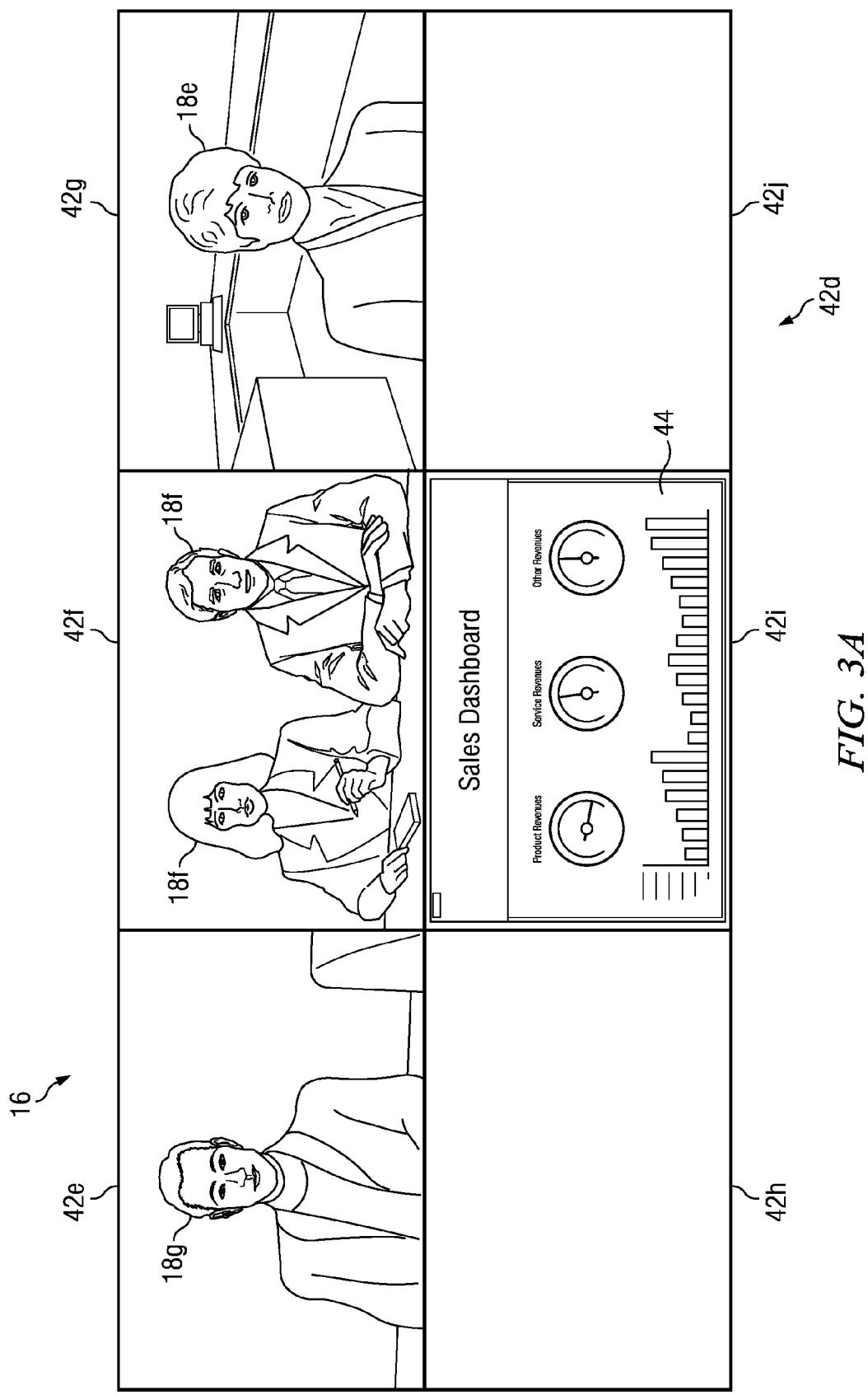
FIGS. 3A-4B are simplified block diagrams illustrating example display areas associated with the present disclosure.

Turning to FIG. 3A, FIG. 3A is a block diagram illustrating additional details associated with system 10. FIG. 3A includes display area 16, which includes multiple display screens 42e-j, where each display screen 42e-j can display content. In another embodiment, display area 16 can include a single screen 42d that can be divided into multiple smaller screens (i.e., display screens 42e-j may be a subdivision of single screen 42d, or may each be an individual standalone screen).

Display screen 42e may display remote participant 18g, display screen 42f may display remote participant 18l, display screen 42g may display remote participant 18e, and display screen 42i may display presentation material 44. In one example, presentation material 44 is deemed not very complex for the size of display screen 42i and presentation material 44 can be viewed by each participant relatively easily. In another example, the participants are sufficiently close to display area 16 such that, as displayed on display screen 42i, presentation material 44 can be viewed by each participant relatively easily.

Figure 3B:
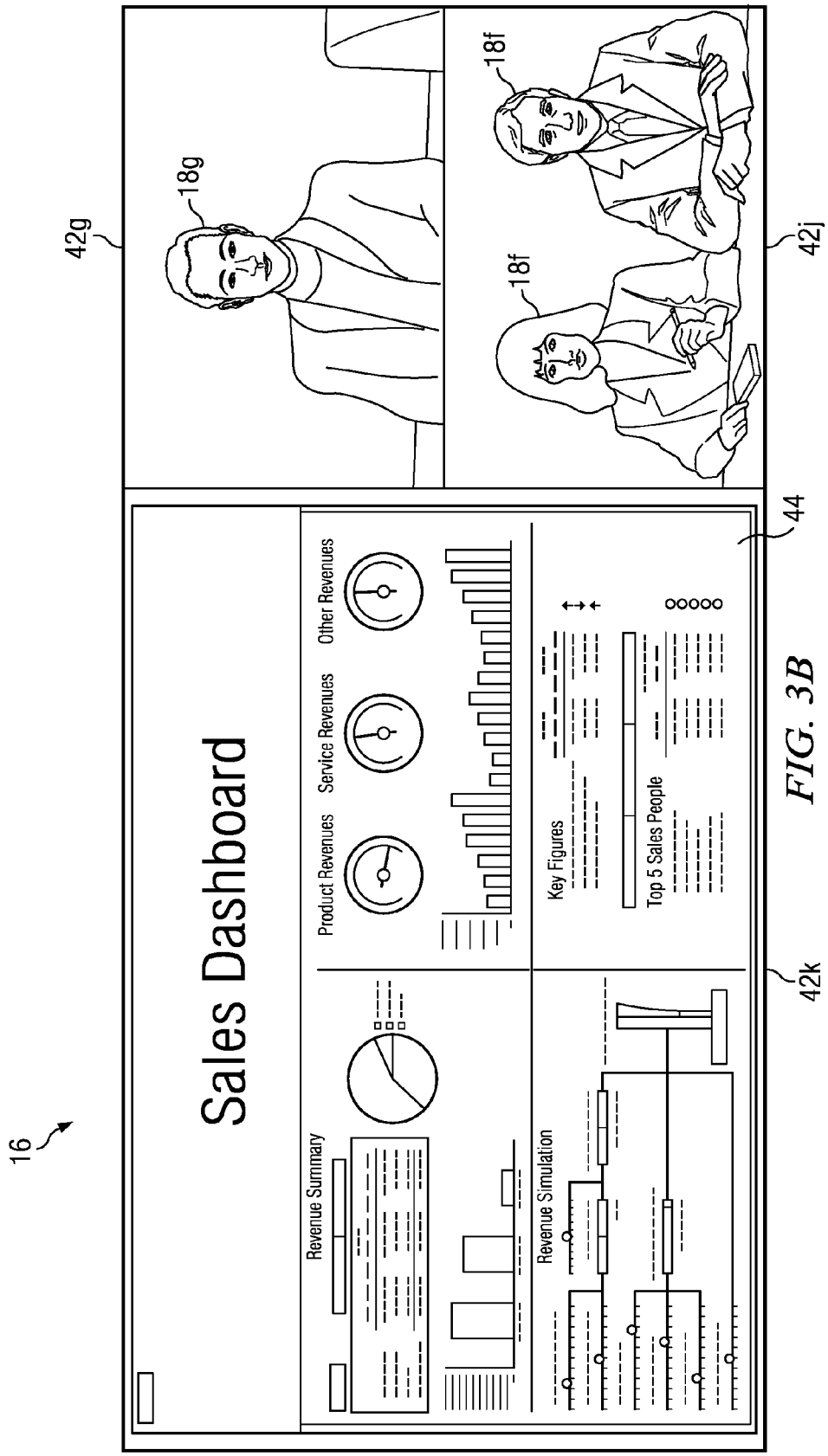

Turning to FIG. 3B, FIG. 3B is a block diagram illustrating additional details associated with system 10. FIG. 3B includes display area 16, which may include multiple display screens 42e-j. In another embodiment, display area 16 includes a single screen 42d that can be divided into multiple smaller screens. Display screen 42k includes presentation material 44. Display screen 42g includes remote participant 18g and display screen 42j includes remote participants 18f.

In one example, presentation material 44 is complex and if displayed on display screen 42i (as shown in FIG. 3A), then presentation material 44 may not have been viewed by each participant relatively easily. As a result, system 10 displays presentation material 44 on screen 42k for easier viewing. In another example, the participants are not sufficiently close to display area 16 and if presentation material 44 was displayed on screen display screen 42i (as shown in FIG. 3A), then presentation material 44 may not have been viewed by each participant relatively easily. As a result, system 10 displays presentation material 44 on screen 42k for easier viewing for the conference participants.

Figure 4A:
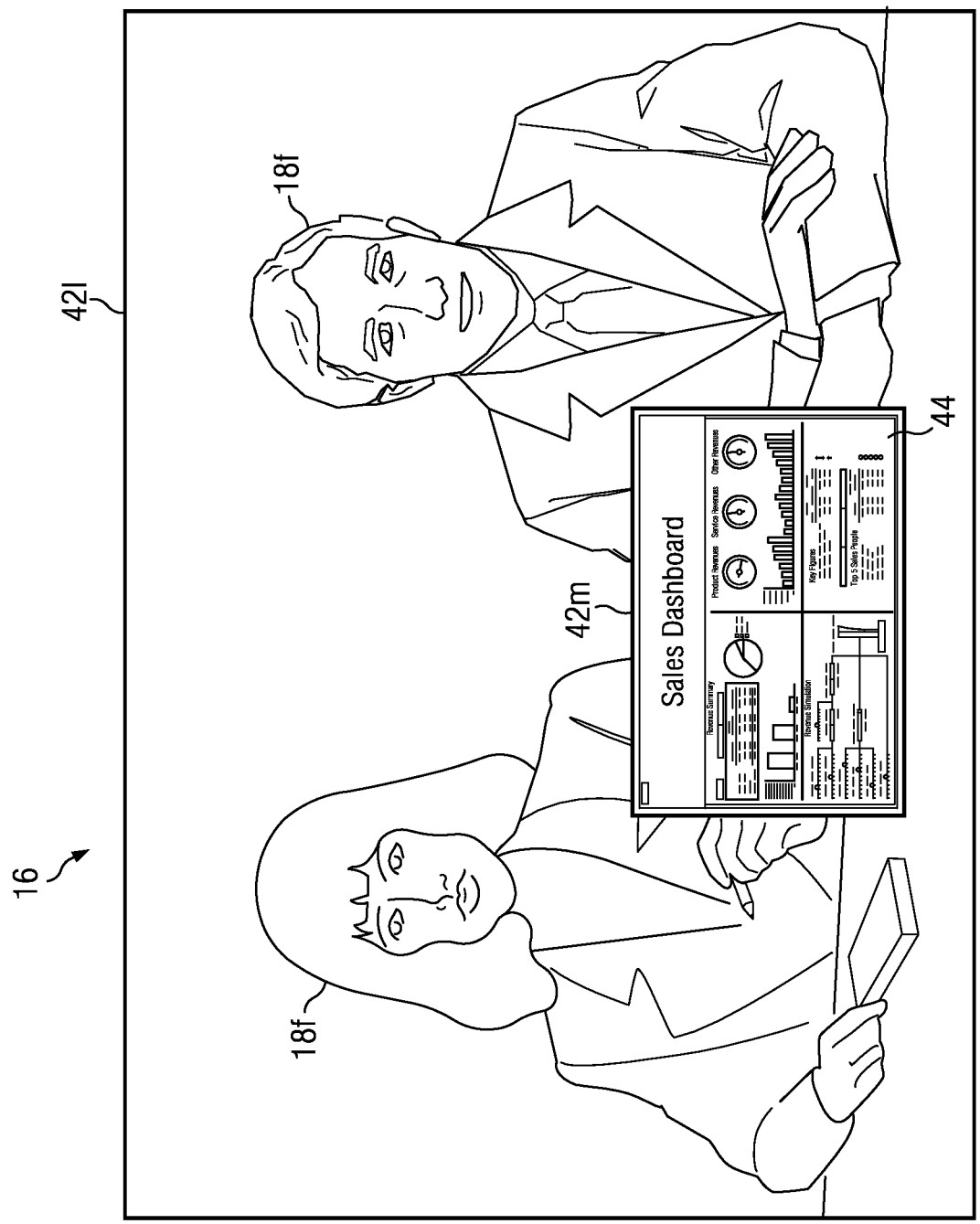

Turning to FIG. 4A, FIG. 4A is a block diagram illustrating additional details associated with system 10. FIG. 4A includes display area 16, which may include primary display 42l and secondary display 42m. Primary display 42l may include a display of participants 18f. Secondary display 42m includes a display of presentation material 44. In one example, presentation material 44 is complex and presentation material 44 may not be viewed by each participant viewing secondary display 42m relatively easily. In another example, the participants are some distance away from display area 16 such that presentation material 44 may not be viewed by each participant relatively easily. As a result, the area presentation material 44 is displayed needs to be larger.

Figure 4B:
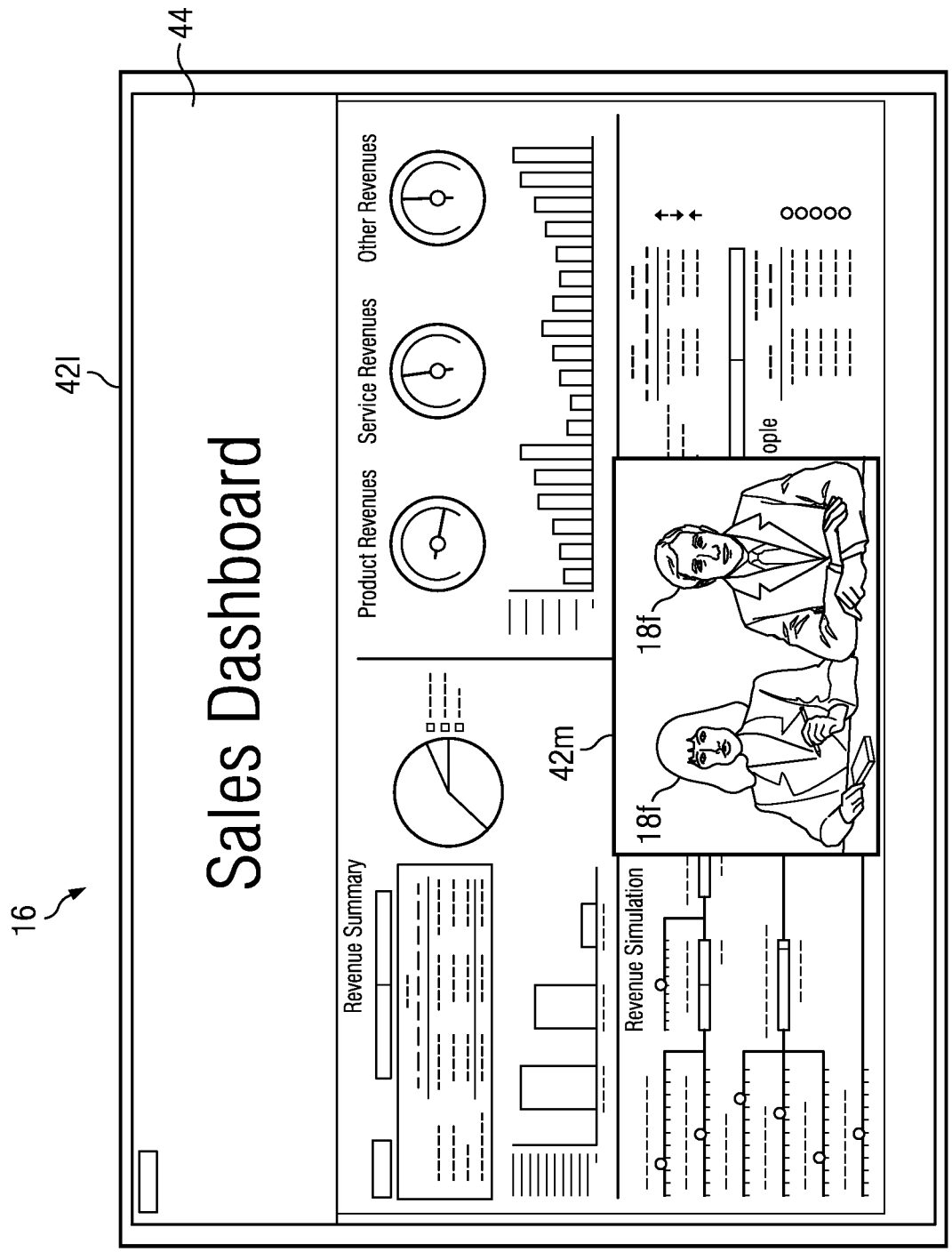

Turning to FIG. 4B, FIG. 4B is a block diagram illustrating additional details associated with system 10. FIG. 4B includes display area 16. Display area 16 includes primary display 42l and secondary display 42m. Primary display 42l includes a display of presentation material 44. Secondary display 42m includes a display of participants 18f.

In one example, presentation material 44 is complex and if presentation material 44 was displayed on secondary display 42m (as shown in FIG. 4A), then presentation material 44 may not have been viewed by each participant relatively easily. As a result, system 10 displays presentation material 44 on primary display 42l for easier viewing by the conference participants. In another example, the participants are not sufficiently close to display area 16 and if presentation material 44 was displayed on secondary display 42m (as shown in FIG. 4A), then presentation material 44 may not have been viewed by each participant relatively easily. As a result, system 10 displays presentation material 44 on primary display 42l for easier viewing by the conference participants.

Figure 5:
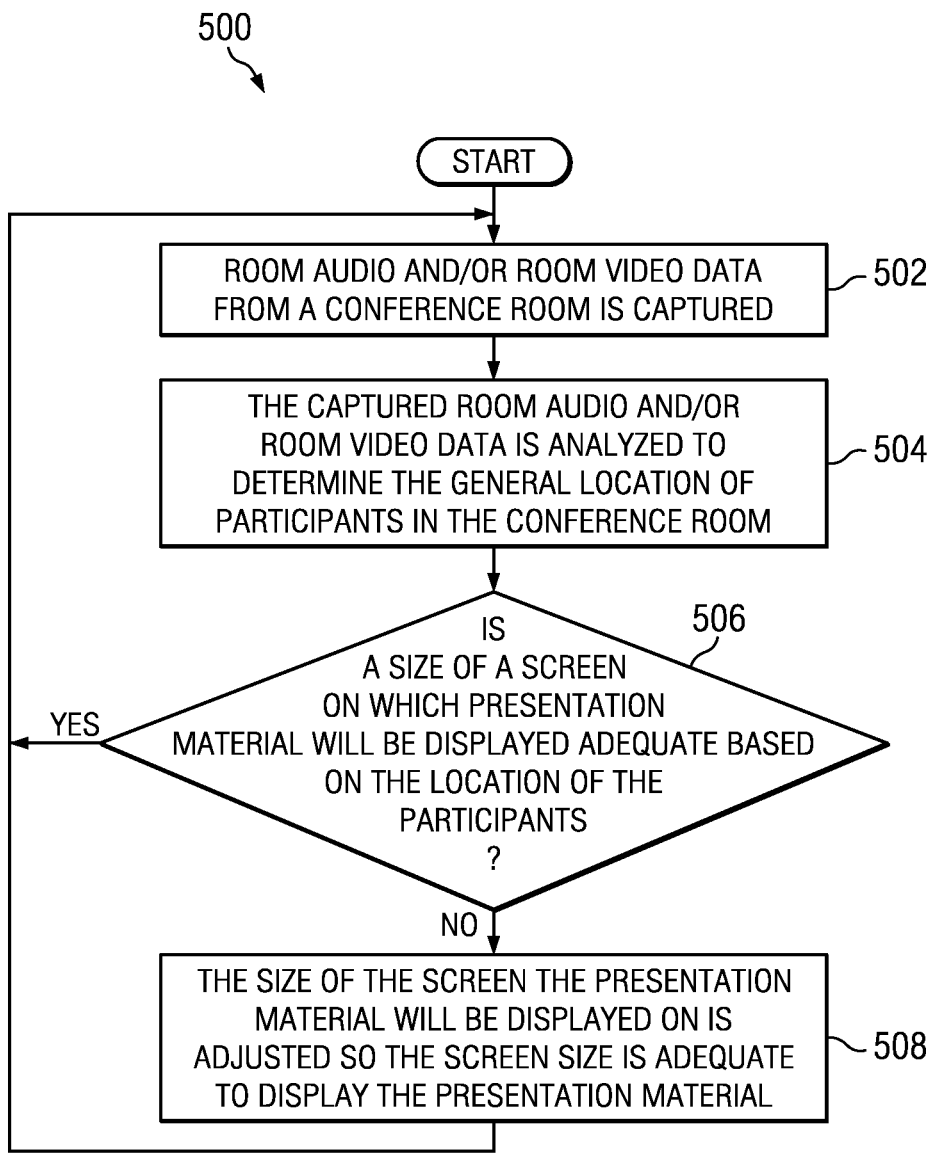
FIG. 5 a simplified flowchart illustrating potential operations associated with the system in accordance with an example embodiment of the present disclosure.

Turning to FIG. 5, FIG. 5 is a simplified flowchart 500 illustrating example activities associated with scaling a Telepresence video presentation based on room participants. At 502, room audio and/or room video data from a conference room is captured. At 504, the captured room audio and/or room video data is analyzed to determine the general location of participants in the conference room. At 506, the system determines if a size of a screen on which presentation material will be displayed is adequate based on the location of the participants. If the system determines that the size of the screen on which presentation material will be displayed is adequate based on the location of the participants, then room audio and/or room video data from the conference room is captured, as illustrated in 502. This will determine if the location of the participants has changed. If the system determines that the size of the screen on which presentation material will be displayed is not adequate based on the location of the participants, then the size of the screen the presentation material will be displayed on is adjusted so the screen size is adequate to display the presentation material, as illustrated in 508.

Figure 6:
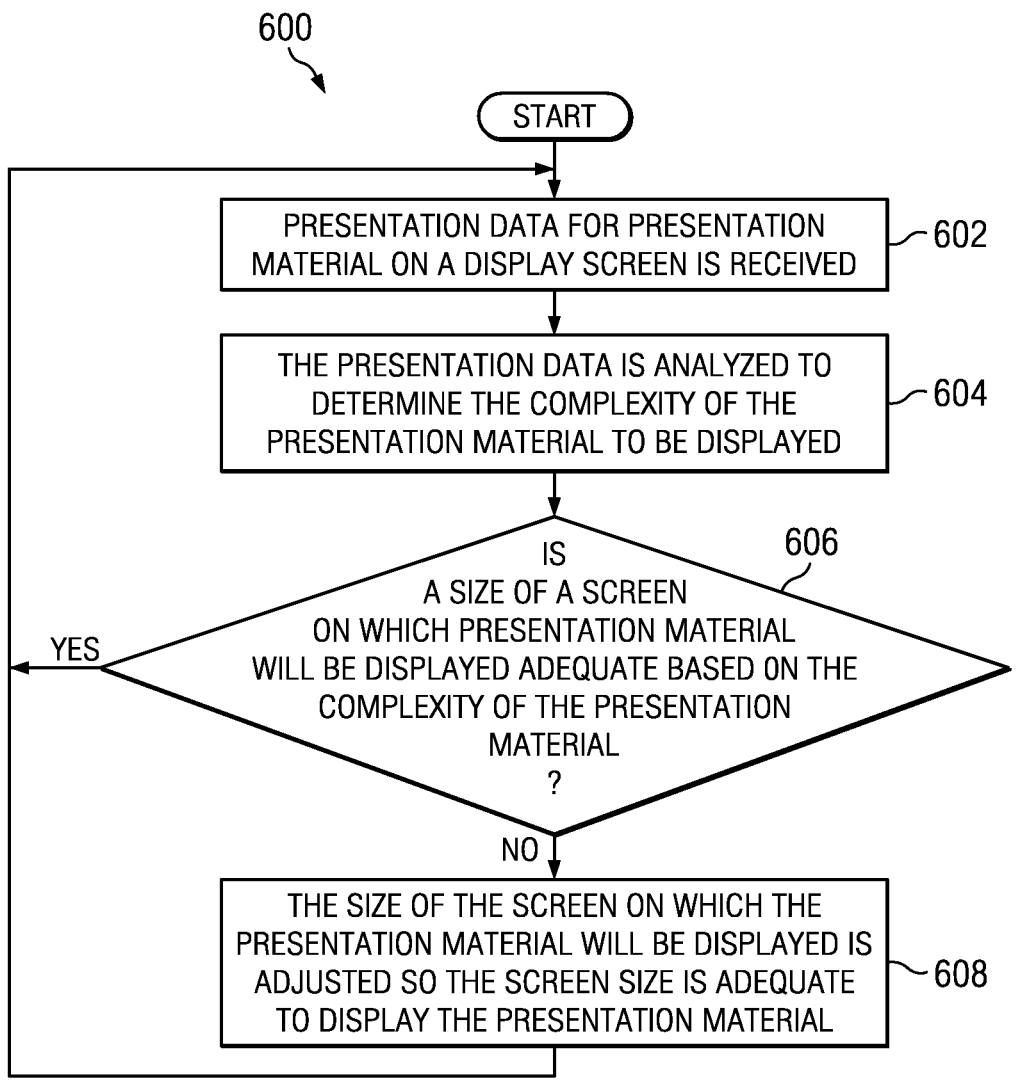
FIG. 6 is another simplified flowchart illustrating potential operations associated with the system in accordance with an example embodiment of the present disclosure.

Turning to FIG. 6, FIG. 6 is a simplified flowchart 600 illustrating example activities associated with scaling a Telepresence video presentation based on presentation complexity. At 602, presentation data for presentation material on a display screen is received. At 604, the presentation data is analyzed to determine the complexity of the presentation material to be displayed. At 606, the system determines if a size of a screen on which the presentation material will be displayed is adequate based on the complexity of the presentation material. If the system determines that the size of the screen on which the presentation material will be displayed is adequate based on the complexity of the presentation material, then presentation data for (new) presentation material on the display screen is received, as illustrated in 602. If the system determines that the size of the screen on which the presentation material will be displayed is not adequate based on the complexity of the presentation material, then the size of the screen on which the presentation material will be displayed is adjusted so the screen size is adequate to display the presentation material, as illustrated in 608.

Figure 7:
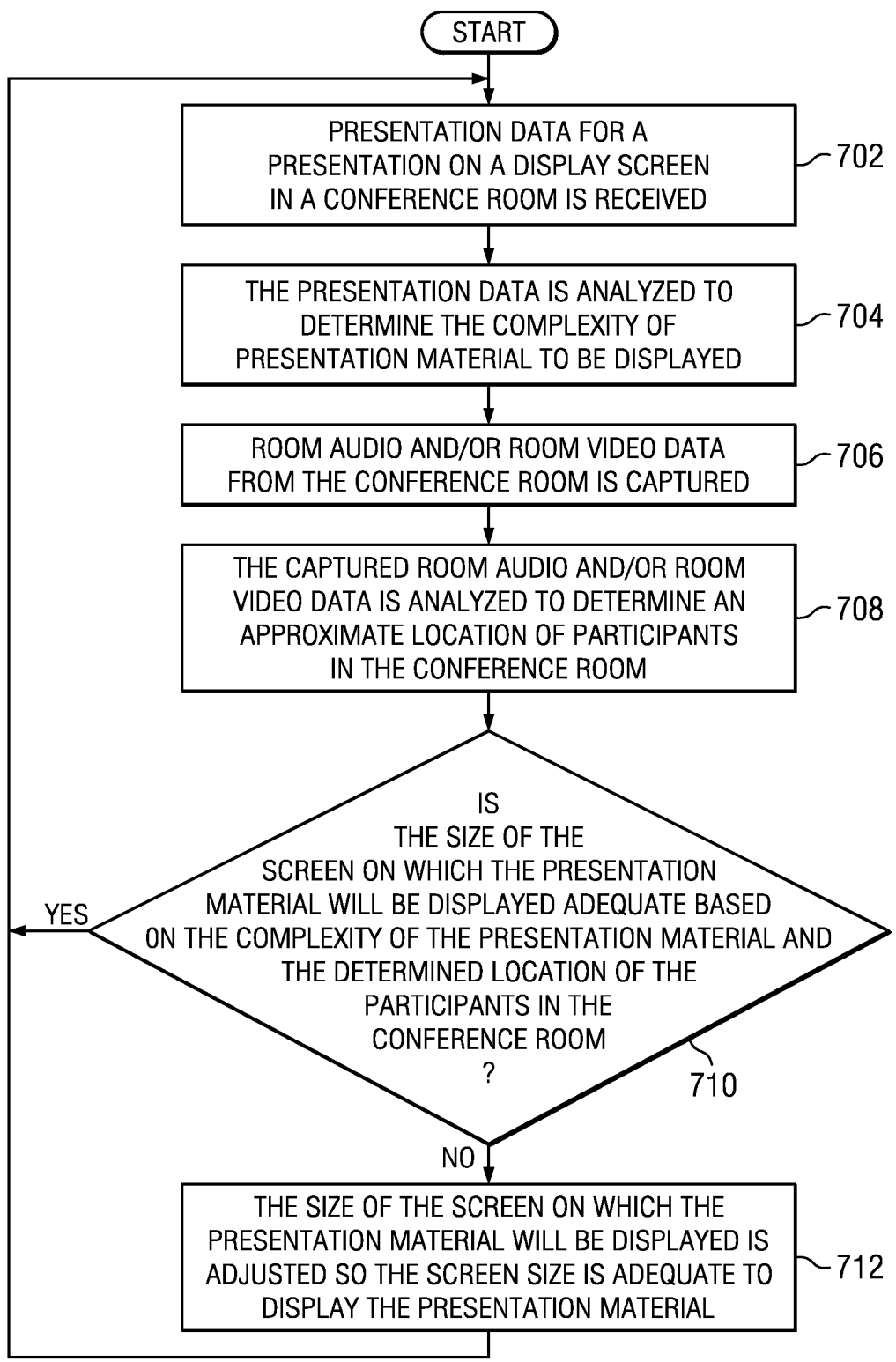
FIG. 7 is another simplified flowchart illustrating potential operations associated with the system in accordance with one embodiment of the present disclosure.

Turning to FIG. 7, FIG. 7 is a simplified flowchart 700 illustrating example activities associated with scaling a Telepresence video presentation based on presentation complexity and room participants. At 702, presentation data for a presentation on a display screen in a conference room is received. At 704, the presentation data is analyzed to determine the complexity of presentation material to be displayed. At 706, room audio and/or room video data from the conference room is captured. At 708, the captured room audio and/or room video data is analyzed to determine an approximate location of participants in the conference room.

At 710, the system determines if the size of the screen on which the presentation material will be displayed is adequate based on the complexity of the presentation material and the determined location of the participants in the conference room. If the size of the screen on which the presentation material will be displayed is adequate based on the complexity of the presentation material and the determined location of the participants in the conference room, then presentation data for a (new) presentation on a display screen in a conference room is received, as illustrated in 702. If the size of the screen on which presentation material will be displayed is not adequate based on the complexity of the presentation material and the determined location of the participants in the conference room, then the size of the screen on which the presentation material will be displayed is adjusted so the screen size is adequate to display the presentation material, as illustrated in 712.

In one implementation, video presentation device 22 includes software to achieve (or to foster) the videoconferencing activities discussed herein. This could include the implementation of instances of presentation complexity module 30, participant analysis module 36, and video display control module 28. Additionally, each of these elements can have an internal structure (e.g., a processor, a memory element, etc.) to facilitate some of the operations described herein. In other embodiments, these videoconferencing activities may be executed externally to these elements, or included in some other network element to achieve the intended functionality. Alternatively, video presentation device 22 may include software (or reciprocating software) that can coordinate with other network elements in order to achieve the videoconferencing activities described herein. In still other embodiments, one or several devices may include any suitable algorithms, hardware, software, components, modules, interfaces, or objects that facilitate the operations thereof.

Hence, a network element (e.g., video presentation device 22) can include software to achieve the videoconferencing operations, as outlined herein in this Specification. In certain example implementations, the videoconferencing functions outlined herein may be implemented by logic encoded in one or more tangible, non-transitory media (e.g., embedded logic provided in an application specific integrated circuit [ASIC], digital signal processor [DSP] instructions, software [potentially inclusive of object code and source code] to be executed by a processor [processors 38a-c shown in FIG. 2], or other similar machine, etc.). In some of these instances, a memory element [memory 40*a*-*c* shown in FIG. 2] can store data used for the operations described herein. This includes the memory element being able to store software, logic, code, or processor instructions that are executed to carry out the activities described in this Specification.

The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the videoconferencing activities as outlined herein. Additionally, each of these devices may include a processor that can execute software or an algorithm to perform the videoconferencing activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that system 10 (and its teachings) are readily scalable and, further, can accommodate a large number of components, as well as more complicated/sophisticated arrangements and configurations. Accordingly, the examples provided should not limit the scope or inhibit the broad teachings of system 10, as potentially applied to a myriad of other architectures.

It is also important to note that the steps in the preceding FIGURES illustrate only some of the possible scenarios that may be executed by, or within, system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain types of endpoints, system 10 is applicable to other endpoint types (e.g., laptops, notebooks, tablets, i-Pads, etc.). Additionally, although specific types of signaling and security have been discussed herein, other signaling exchanges and protocols in which data are exchanged in order to provide videoconferencing operations are clearly encompassed within the broad teachings of the present disclosure. In addition, although system 10 has been illustrated with reference to particular elements and operations that facilitate the communication process, these elements and operations may be replaced by any suitable architecture or process that achieves the intended functionality of system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    receiving a first presentation material for a videoconference, wherein the first presentation material is to be displayed in a display area associated with the videoconference;
    determining a first complexity of the first presentation material; displaying the first presentation material on a first display based on the determined first complexity; and
    displaying the first presentation material on a second display based on a location of a participant.
2. The method of claim 1, further comprising:
    determining the location of the participant that will view the first presentation material.
3. The method of claim 2, wherein the location of the participant is determined using audio data or video data.
4. The method of claim 1, further comprising:
    receiving a second presentation material to be displayed;
    determining a second complexity of the second presentation material, wherein the second complexity is greater than the first complexity; and
    displaying the second presentation material on the second display based on the determined second complexity, wherein the second display is larger than the first display.
5. The method of claim 4, further comprising:
    determining the location of the participant that will view the first presentation material; and displaying the second presentation material on the second display based on the location of the first participant in relation to the complexity of the first presentation material.

6. The method of claim 1, wherein the display area comprises a single screen that can be electronically divided into a plurality of smaller screens.

7. The method of claim 1, wherein the display area comprises a plurality of standalone display screens.

8. The method of claim 1, wherein the determining further comprises:
scanning the first presentation material to determine the first complexity and a text size associated with the first presentation material.

9. The method of claim 1, further comprising:
using a face detection operation in order to determine an approximate distance between the participant and a screen being viewed by the participant.

10. The method of claim 1, further comprising:
using voice positioning data in order to determine an approximate distance between the participant and a screen being viewed by the participant.

11. The method of claim 1, further comprising:
using room setup information in order to determine an approximate distance between the participant and a screen being viewed by the participant.

12. The method of claim 1, further comprising:
using data from multiple camera angles in order to determine an approximate distance between the participant and a screen being viewed by the participant.

13. Logic encoded in non-transitory media that includes code for execution and when executed by a processor operable to perform operations comprising:
receiving a first presentation material for a videoconference, wherein the first presentation material is to be displayed in a display area associated with the videoconference;
determining a first complexity of the first presentation material;
displaying the first presentation material on a first display based on the determined first complexity; and
displaying the presentation material on a second display based on a location of a participant.

14. The logic of claim 13, the operations further comprising:
determining the location of the participant that will view the first presentation material.

15. The logic of claim 14, wherein the location of the participant is determined using audio data or video data.

16. The logic of claim 13, wherein the determining further comprises:
scanning the first presentation material to determine the first complexity and a text size associated with the first presentation material.

17. The logic of claim 13, the operations further comprising:
using a face detection operation in order to determine an approximate distance between the participant and a screen being viewed by the participant.

18. A network element, comprising:
a memory element configured to store data;
a video display control module; and
a processor operable to execute instructions associated with the data, wherein the processor, the video display control module, and the memory element cooperate such that the network element is configured to:
receive a first presentation material for a videoconference, wherein the first presentation material is to be displayed in a display area associated with the videoconference;
determine a first complexity of the first presentation material;
display the first presentation material on a first display based on the determined first complexity; and
display the presentation material on a second display based on a location of a participant.

19. The network element of claim 18, wherein the network element is further configured to:
scan the first presentation material to determine the first complexity and a text size associated with the first presentation material.

20. The network element of claim 18, wherein the network element is further configured to:
use a face detection operation in order to determine an approximate distance between the participant and a screen being viewed by the participant.

* * * * *